(12) United States Patent
Cwik et al.

(10) Patent No.: US 9,068,905 B2
(45) Date of Patent: Jun. 30, 2015

(54) METHOD FOR DETERMINING A ROTATIONAL SPEED OF A DRIVESHAFT OF AN INTERNAL COMBUSTION ENGINE

(75) Inventors: Matthias Cwik, Stuttgart (DE); Markus Roessle, Stuttgart (DE); Ewald Mauritz, Weissach (DE); Stefan Tumback, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 13/581,264

(22) PCT Filed: Feb. 23, 2011

(86) PCT No.: PCT/EP2011/052631
§ 371 (c)(1),
(2), (4) Date: Oct. 29, 2012

(87) PCT Pub. No.: WO2011/104248
PCT Pub. Date: Sep. 1, 2011

(65) Prior Publication Data
US 2013/0125636 A1    May 23, 2013

(30) Foreign Application Priority Data
Feb. 27, 2010   (DE) .................. 10 2010 009 648

(51) Int. Cl.
| G01M 15/04 | (2006.01) |
| G01M 13/02 | (2006.01) |
| F02N 11/08 | (2006.01) |
| G01P 3/64  | (2006.01) |

(52) U.S. Cl.
CPC ........... *G01M 13/02* (2013.01); *F02N 11/0855* (2013.01); *F02N 2200/022* (2013.01); *F02N 2300/2006* (2013.01); *G01P 3/64* (2013.01)

(58) Field of Classification Search
CPC .................... G01M 15/042; G01M 15/046
USPC ................... 73/114.04, 114.25, 114.26
See application file for complete search history.

(56) References Cited

U.S. PATENT DOCUMENTS

| 4,527,422 A * | 7/1985 | Honig et al. ............... 73/114.26 |
| 5,040,412 A * | 8/1991 | Wannenwetsch ........... 73/114.25 |
| 5,132,909 A * | 7/1992 | Schroeder et al. ............ 701/101 |
| 5,415,035 A * | 5/1995 | Shimasaki et al. ......... 73/114.04 |

(Continued)

FOREIGN PATENT DOCUMENTS

| DE | 10234949 | 10/2003 |
| DE | 10217560 | 4/2004  |

(Continued)

OTHER PUBLICATIONS

International Search Report for Application No. PCT/EP2011/052631 dated Jun. 15, 2011 (English Translation and Original, 6 pages).

*Primary Examiner* — Eric S McCall
(74) *Attorney, Agent, or Firm* — Michael Best & Friedrich LLP

(57) ABSTRACT

A method determines a rotational speed of a driveshaft of an internal combustion engine. The rotating driveshaft assumes different rotary positions at different times. An average gradient of rotary speed for the driveshaft is determined at at least two rotary positions. Subsequently, an average rotational speed for the driveshaft is obtained from a past average gradient of rotary speed at at least one later point in time.

17 Claims, 11 Drawing Sheets

(56) References Cited

U.S. PATENT DOCUMENTS

| | | | |
|---|---|---|---|
| 5,493,901 A * | 2/1996 | Kuroda et al. | 73/114.04 |
| 5,689,065 A * | 11/1997 | Kuroda et al. | 73/114.04 |
| 5,747,681 A * | 5/1998 | Kuroda et al. | 73/114.04 |
| 6,199,007 B1 * | 3/2001 | Zavarehi et al. | 701/111 |
| 6,234,010 B1 * | 5/2001 | Zavarehi et al. | 73/114.15 |
| 6,968,268 B2 * | 11/2005 | Yamada et al. | 701/111 |
| 7,027,911 B2 | 4/2006 | Nishikawa et al. | |
| 7,047,125 B1 * | 5/2006 | He et al. | 701/110 |
| 7,066,128 B2 | 6/2006 | Satake et al. | |
| 7,269,499 B2 | 9/2007 | Murakami et al. | |
| 7,376,505 B2 | 5/2008 | Skala et al. | |
| 7,614,290 B2 * | 11/2009 | Shikama et al. | 73/114.25 |
| 2010/0064786 A1 | 3/2010 | Ge et al. | |
| 2010/0282199 A1 | 11/2010 | Heyers et al. | |
| 2011/0184626 A1 | 7/2011 | Mauritz et al. | |

FOREIGN PATENT DOCUMENTS

| | | |
|---|---|---|
| DE | 102007024416 | 11/2008 |
| EP | 1457652 | 9/2004 |
| EP | 1574835 | 9/2005 |
| WO | 2009083477 | 7/2009 |

* cited by examiner

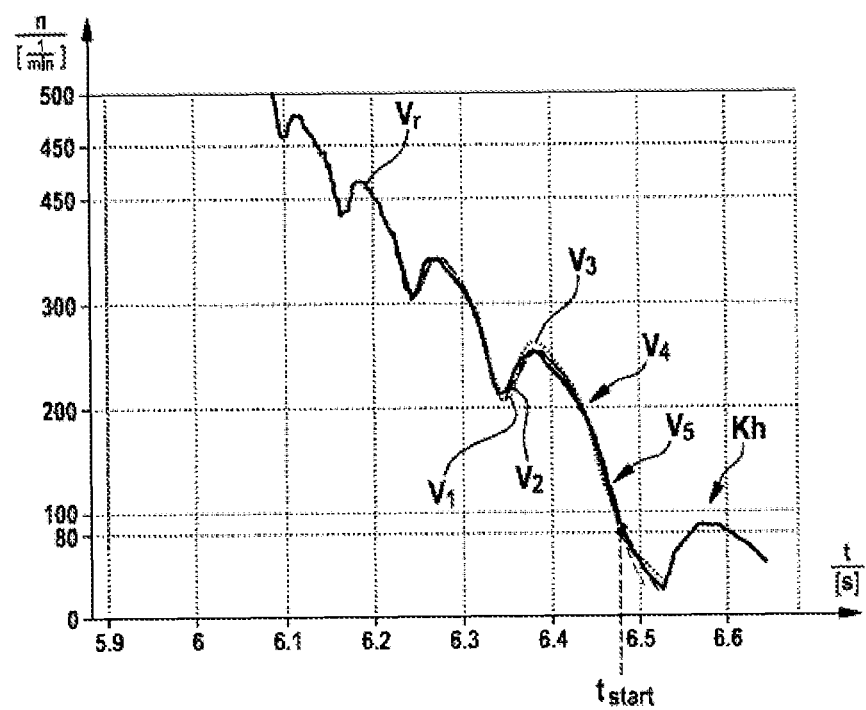

METHOD FOR DETERMINING A ROTATIONAL SPEED OF A DRIVESHAFT OF AN INTERNAL COMBUSTION ENGINE

BACKGROUND OF THE INVENTION

The invention relates to a method for determining a rotational speed of a rotating driveshaft of an internal combustion engine. Proceeding from a rotating driveshaft with a macroscopically reducing angular speed, the rotational speed of the driveshaft, for example of the crankshaft, should be determined at a later point in time (prognosis of the rotational speed or of the rotational speed course). Here, a macroscopically reducing angular speed is understood to mean, by way of example, the property that a rotational speed changes in a manner which can be detected by a human. Such a situation is present, for example, when the internal combustion engine is shut down and, by way of example, passes from the idle state to the standstill state.

DE 10 2006 011 644 A1 discloses an apparatus and a method for operating an apparatus having a starter pinion and a toothed ring of an internal combustion engine. In this case, the rotational speed of the toothed ring and of the starter pinion is determined in order to engage the starter pinion, after the internal combustion engine has been shut down, at a substantially identical rotational speed during the run-down of the internal combustion engine. Values from a characteristic map of a control unit are assigned in order to determine the synchronous engagement rotational speeds.

DE 10 2006 039 112 A1 describes a method for determining the rotational speed of the starter of an internal combustion engine. Said document states that the starter comprises its own starter control unit in order to calculate the rotational speed of the starter and, in start-stop operation, in order to accelerate the pinion of the starter initially without engagement, if self-starting of the internal combustion engine is no longer possible on account of the fact that the rotational speed has dropped. The pinion is meshed at a synchronous rotational speed into the toothed ring of the running-down internal combustion engine.

The German application DE 102008041037 describes how a rotational speed behavior of a crankshaft of an internal combustion engine is prognosticated. In this case, rotational speed or time pairs of past top dead centers or bottom dead centers (relative extrema) are used for forecasting the rotational speed behavior of the crankshaft or of the driveshaft and the point in time for following top dead centers and bottom dead centers.

SUMMARY OF THE INVENTION

The method according to the invention having the features of the main claim has the advantage that rotary positions of the rotating driveshaft are used for determining a rotational speed of a driveshaft of an internal combustion engine at at least one later point in time, these rotary positions being selected in such a way that a past average rotary behavior can be determined or can be calculated. An average rotational speed at at least one later point in time can be inferred therefrom.

This has the effect that extreme rotary positions or rotary properties of the driveshaft which usually regularly arise at top dead centers (TDC) or bottom dead centers (BDC) are not used for calculation, and as a result ultimately better prediction results are achieved. This is significant inasmuch as, by way of example, partially or completely closed air suction flaps in the air supply part of the internal combustion engine can have a relatively strong influence on the position of a bottom dead center in a rotational speed characteristic curve, for example. This device then also similarly influences the rotational speed behavior at the top dead center. The use of rotary positions between top dead centers and bottom dead centers, or rotary positions of the driveshaft which lie between positions in which one cylinder or the other cylinder of an internal combustion engine is situated in a top or bottom dead center, has the effect that the prognosis of the rotational speed behavior becomes significantly more stable and more reliable.

To further stabilize the forecasting or prognosis of the further average course of the rotational speed behavior, it is provided according to a further configuration of the invention that a further past average rotary behavior is determined after a past average rotary behavior has been determined. This can advantageously then be used in order to infer an average rotational speed at at least one later point in time. With this further past average rotary behavior, the original prognosis on the basis of a further past average rotary behavior can be further improved. This can be carried out, for example, by using merely the further past average rotary behavior for this purpose, without using the previous past average rotary behavior for the prognosis (complete updating).

The further past average rotary behavior can, however, also be used in order to stabilize the validity of a known past average rotary behavior, for example by determining an arithmetic mean value of two average past rotary behaviors within different periods of time. According to a further configuration of the invention, it is provided that this arithmetic mean value of the average rotary behavior is a moving mean value. In this case, it is possible to use the last three, four, five or more average past rotary behaviors, for example.

Since the average rotary behavior of the internal combustion engine does not correspond to the real rotary behavior, but rather represents only an approximation, it is provided according to a further configuration of the invention that an alteration component is added to an average rotational speed at a specific point in time for determining a prognosticated rotational speed with increased precision. This alteration component ensures that the oscillation parts of the actual course or behavior of an outgoing internal combustion engine are superposed over the average rotary behavior. As a result of this alteration component, the prognosticated rotational speed course is ultimately predicted (prognosticated) as realistically as possible. In this case, it is provided that the alteration component is determined as the product of a standardized value and a rotational-speed-dependent amplitude characteristic value.

According to a further configuration of the invention, it is provided that a standardized value is stored in a characteristic map, wherein a rotary position is assigned to a standardized value and a rotational-speed-dependent amplitude characteristic value is stored in another characteristic map. According to one dependent claim, it is provided that, depending on the rotational speed of the driveshaft, a plurality of different characteristic curves are stored in one or more characteristic maps, wherein different amplitude characteristic values can be determined using the plurality of different characteristic curves. This has the advantage that, by way of example, different amplitude characteristic values can be determined, and as a result the forecasting of the prognosticated rotational speed behavior can be adapted to changes in the system.

BRIEF DESCRIPTION OF THE DRAWINGS

The invention will be explained in more detail on the basis of at least one exemplary embodiment and with reference to drawings.

The drawings show exemplary embodiments of the method according to the invention and also a control apparatus and a system having a control apparatus and a starting apparatus. In the drawings:

FIG. 10a, FIG. 10b and FIG. 11 show various rotational speed prognoses, and FIG. 12 schematically shows a motor vehicle.

DETAILED DESCRIPTION

Figure 1:
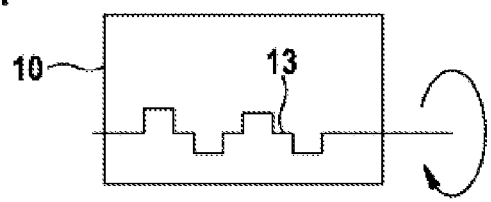
FIG. 1 shows a schematic view of an internal combustion engine having a driveshaft.

FIG. 1 schematically shows an internal combustion engine 10. In addition to many other components, this internal combustion engine 10 has, inter alia, a driveshaft 13, which is in the form of a crankshaft, for example. As such a crankshaft, this driveshaft 13 is driven by means of connecting rods (not shown) and pistons articulatedly connected thereto. These pistons in turn are usually driven in cylinders by what is known as internal combustion. The relationships in this respect are widely known. The driveshaft 13 can alternatively also be the eccentric shaft of a rotary-piston Wankel engine.

Figure 2:
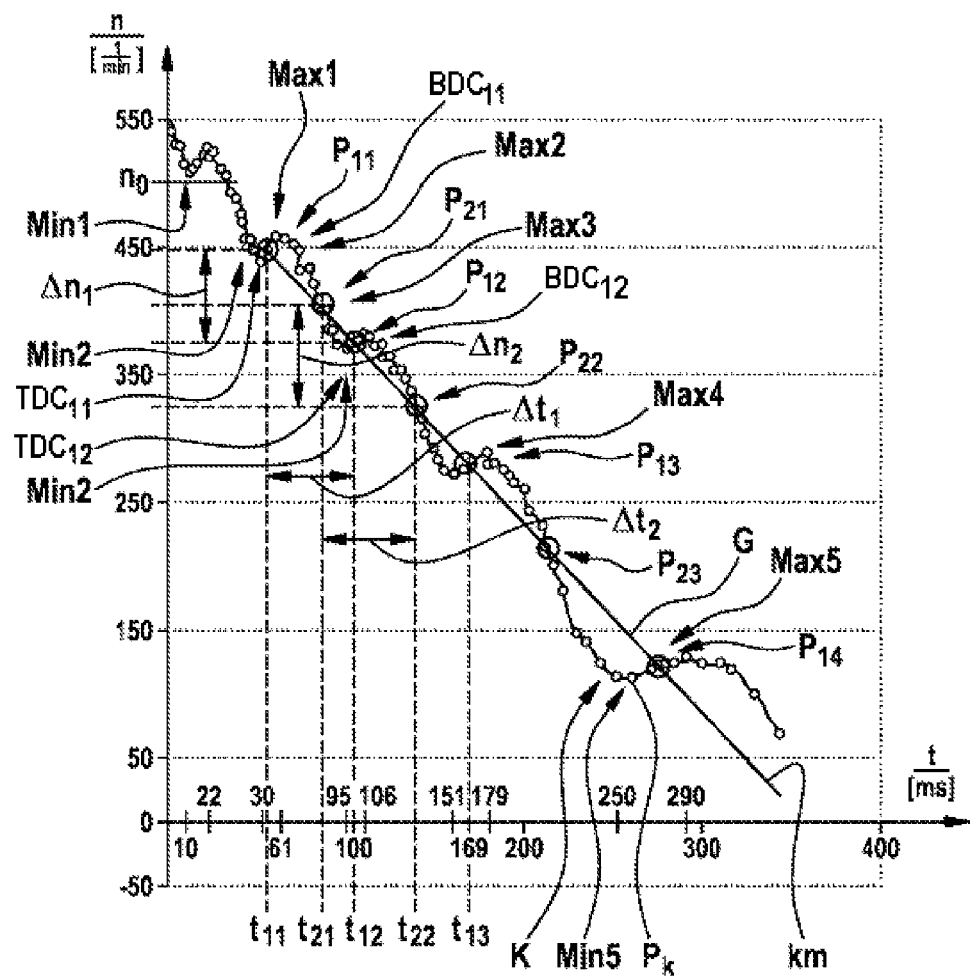
FIG. 2 shows a first exemplary rotational speed/time graph which shows the time-dependent rotational speed course of a driveshaft.

FIG. 2 shows by way of example a rotational speed/time graph (n(t) graph). This graph shows which instantaneous rotational speed n(t) a driveshaft 13 has when the internal combustion engine 10 is in what is known as the run-down mode. In the run-down mode means that the internal combustion engine 10 is no longer fuelled, i.e. no more drive power should be output via the driveshaft 13 to the drive wheels of a motor vehicle.

In FIG. 2, by way of example, a rotational speed (n)/time (t) course of a driveshaft 13 is firstly recorded, and is shown in this graph. Signals were evaluated for determining the curve K. These signals were obtained by using a sensor 15 (FIG. 12) to sense an indicator wheel 14 connected fixedly in terms of rotation to the driveshaft 13. This indicator wheel has a hole grid, as a result of which a signal can be obtained in substantially all six angular degrees. Each one of the small points $P_K$ was formed by evaluating this indicator wheel. The curve K is what is known as a polyline, which connects the centers of the multiplicity of points $P_K$ to one another.

When considering the curve K, it can be seen that the course of the curve substantially slopes steeply over a relatively long period of time (macroscopically, for example between t=0 and t13=160 ms later), which is not surprising in the case of an internal combustion engine which is shut down. It can furthermore be gathered from this substantially steeply sloping course of the curve that the rotational speed values fluctuate, depending on the time, about a mean value or an average constant gradient, represented by the seemingly continuous line G. The line G is actually a simplified illustration of a plurality of short paths which run straight at least between two adjacent support points such as P11 and P12 or P12 and P13 or, for example, between P21 and P22 or P22 and P23. In actual fact, it may be the case that, for example, the paths between P11 and P12 or P12 and P13 have the same gradient m as a whole and therefore merge into one another at P12 in a straight manner without kinks. Therefore, proceeding from the origin of this graph, it is possible to identify relative minima at the points in time 10 ms, 50 ms, 95 ms, 151 ms and 250 ms. Relative maxima can be identified at the points in time 22 ms, 61 ms, 106 ms, 174 ms and 290 ms. The relative minima are denoted by the designations Min1, Min2, Min3, Min4 and Min5, and the relative maxima are denoted by Max1, Max2, Max3, Max4 and Max5. These relative minima and relative maxima come about as a result of the typical compression and decompression cycles of the internal combustion engine 13. Otherwise, it cannot be seen from this curve K whether this is a curve K which describes the rotational speed behavior of a 2-cylinder, 3-cylinder, 4-cylinder, 6-cylinder or 8-cylinder internal combustion engine. The points $P_K$ shown in FIG. 2 were determined, by way of example, on a 6-cylinder internal combustion engine.

The text which follows describes how a rotary behavior of the driveshaft 13 at a later point in time is inferred proceeding from various rotary positions of the driveshaft 13 at different points in time and therefore from rotary positions at different points in time in the past.

FIG. 2 describes a starting rotational speed $n_0$, which here is to be determined at 500/min. This starting rotational speed $n_0$ represents an event which, as it were, is intended to be a starting condition for the method according to the invention. If this starting rotational speed $n_0$ is undershot, the method sequence begins, for example. Conventional internal combustion engines have means in order to detect the rotational speed of the crankshaft or driveshaft thereof. Alternatively, it would also be possible to evaluate a rotational speed of a shaft correlating therewith, for example a camshaft of the internal combustion engine, or the rotational speed of a current generator (alternating current generator). The method begins with the determination of rotary positions PHI11, PHI12; PHI21, PHI22 and the assigned points in time t11, t12; t21, t22 thereof below a set rotational speed threshold (n0).

The driveshaft 13 rotates further even after the starting rotational speed $n_0$ has been undershot. The angular distance between virtually each general point $P_K$ shown in FIG. 2 is six angular degrees with respect to the rotation of the driveshaft 13. A complete revolution of the driveshaft 13 requires 360°. In this case, the driveshaft 13 passes through all the actually measured points $P_K$ which are shown in FIG. 2. In order to infer events which take place in the future from a consideration of the past, i.e. on the basis of points $P_K$ or states (n(t)) which the driveshaft 13 has passed through, i.e. in order to determine a rotary behavior of the driveshaft 13 in the future, the following procedure is proposed in this respect:

For the purposes of the method, a characteristic rotary position is selected (Phi11). Proceeding from this rotary position Phi11 of the driveshaft 13, which is represented by the point P11, and which is a point $P_K$ of the curve K, a further rotary position Phi12 of the driveshaft 13, represented by the point P12, is used in order to determine an average gradient between these two points P11 and P12. For reasons of clarity, the section of the curve K which has just been mentioned is shown on an enlarged scale in FIG. 3. The difference in rotational speed between the rotational speed n11 at the point P11 and the rotational speed n12 at the point P12 is −72 revolutions/min. The difference in time between the point P12 at the point in time t12 and the point P11 at the point in time t11 is $\Delta t_1 = 50$ ms. With respect to a point in time after t12, it is therefore possible to determine a past average rotary behavior. This average rotary behavior, denoted here too by the characters $m_1$, corresponds to the average gradient between the two points P11 and P12. Proceeding, for example, from the properties which are present at the point P12—i.e. after passage through the next relative minimum—it is then possible to infer, for example at the point in time t13=160 ms, which average rotational speed n13 is present at the point P13. The past average rotary behavior m1 which arises is the quotient m1=$\Delta$n1/$\Delta$t1=-72/(50 ms*min)=-1.44/(ms*min). For the point in time t13=160 ms (see also FIG. 2), a difference in rotational speed between $P_{12}$ and $P_{13}$ of $\Delta$n2=-83.5/min and accordingly a rotational speed $n_{13}=n_{12}+\Delta n2$=370/min-83.5/min=276.5/min subsequently result with a difference in time of $\Delta$t=58 ms and a past average rotary behavior m1=-1.44/(ms*min). The point in time $t_{13}$, which here is not randomly selected as an intersection of the curve K with the average gradient in the example, specifically represents a later, quite general point in time tX. The rotational speed n13 represents a later, predetermined average rotational speed nX at the point in time tX.

What is therefore disclosed is a method for determining a rotational speed nX(tX) of a driveshaft 13 of an internal combustion engine 10 at at least one later point in time tX. The rotating driveshaft 13 assumes various rotary positions PHI11, PHI12, PHI21, PHI22 etc. at various points in time t11, t12, t21, t22 etc., wherein a past average rotary behavior m1, m2 etc. can be determined from at least two rotary positions PHI11, PHI12 or PHI21, PHI22. An average rotational speed nX is inferred from this average rotary behavior m1, m2 at at least one later point in time tX.

For taking factors which might have a more or less significant influence on the course of the curve K into consideration, it is provided according to a further proposal to take into consideration a further past average rotary behavior m2. The points P21 and P22 can serve as an example therefor in relation to the procedure which has already been described for the average rotary behavior m1 and the two points P11 and P12. In this case, the point P21, proceeding from which the next average rotary behavior m2 is determined, is at a rotary position PHI21, and the point P22 is at a rotary position PHI22. Both the rotary position PHI21 and the rotary position PHI22 are in turn selected in such a way that substantially an average gradient of the curve K can be described by these two points P21 and P22.

At the point P22, the driveshaft 13 has the property, i.e. instantaneous rotational speed, n22, and at the point P21 it has the property, i.e. instantaneous rotational speed, n22 $\Delta$n2=n22-n21 here is -74/min per minute, and the difference in time $\Delta$t2 between the points P22 and P21 is 53 ms. After the point in time t22 at the point P22, it is possible to determine a past average rotary behavior m2. This corresponds to the average gradient between the two points P21 and P22. The past average rotary behavior m2 which arises is the quotient $\Delta$n2/$\Delta$t2=m2=-74/(53 ms*min)=-1.40/(ms*min).

As described here, a further past average rotary behavior m2 is determined after a past average rotary behavior m1 has been determined.

Proceeding from this second or further past rotary behavior m2, the method can be continued in at least two different ways. In a first method progression, it is proposed to use the most recent consideration of the past—here the average rotary behavior m2—as the further, sole basis for determining a coming, later property, i.e. instantaneous rotational speed nX, at a later general point in time tX.

This point in time can be, for example, the point in time t13 or another point in time. The method which has just been described for determining this later property nX—here n13—at the point in time tX—here t13—is then employed analogously in order to obtain n13 at the point in time t13 by m2.

The second possibility of making an inference by virtue of an assumed later average rotary behavior mX at a point in time tX for determining a coming, later property, i.e. instantaneous rotational speed nX, at a later general point in time tX consists in using the two average rotary behaviors m1 and m2 to determine an arithmetic mean value of the average rotary behavior mq.

Accordingly, the arithmetic mean value and therefore the average (notional) rotary behavior which arises is mq=-1.42/(ms*min)=½*(m1+m2).

Proceeding from the point P22, it is then possible, for example, to infer an average notional, i.e. theoretical, rotary behavior mX at a later point in time tX using the mean value mq=-1.42/(ms*min) formed from the two average rotary behaviors m1 and m2 mentioned. For the point in time t23=213 ms at the point P23, what therefore arises proceeding from t22=135 ms, and therefore 78 ms later at the point P23, is a rotational speed reduction by $\Delta$n3=-110/min, such that a rotational speed n23=n22+$\Delta$n3=328/min-110/min=218/min arises at the point in time t23.

Up to this point, the principle of this method or of the various method variants has become clear. It is readily possible to take further average rotary behaviors m3 . . . mi (i corresponds to an integer such as 4, 5, 6, 7, etc.) into consideration. Should consideration no longer be given to old rotary behaviors m, and in each case the most recent prognosis from an average rotary behavior mi be used in order to determine the future or the later average rotary behavior mX, older rotary behaviors are not taken into consideration, and instead the respectively most recent average rotational speed property is taken into consideration, for example. Thus, by way of example, in each case the two, three or four (or more) most recent rotary behaviors can be taken into consideration ("moving" average rotary behavior).

An arithmetic mean value can therefore also be formed from the average rotary behaviors m1 to mi mentioned. This would mean that all or at least a large proportion of the previously determined average rotary behaviors m1 to mi are taken into consideration (mq=1/i*(m1+m2+ . . . +mi). In this case, mi does not have to be the most recent determined rotary behavior. It may also be the penultimate determined average rotary behavior. Within the context of this method, it is provided as an alternative that the average rotary behavior mq is a moving mean value. This means that, for example, for an average rotary behavior mq which is to be used for determining the rotary behavior or a rotational speed at the point in time tX, this consists for example only of—for example the last—three average rotary behaviors mi, mi-1 and mi-2 (mq=⅓*(mi+mi-1+mi-2). Furthermore, the average rotary behavior mq as a moving mean value can of course also be determined only from two average rotary behaviors in the past mi and $m_{i-1}$ (mq=½*($m_{i+1}$).

With respect, for example, to FIG. 2, this would mean that two average rotary behaviors mi and mi-1 in the past are used in order to determine the moving mean value mq. For the point in time t22 and the time thereafter, this means that the average rotary behaviors m1 and m2 are used in order to determine a mean value of the average rotary behavior mq. After the point in time t13 and therefore after the average rotary behavior m3 has been determined (determined from the states of points P12 and P13), the first average rotary behavior m1 would be dropped as the basis for calculation, for example, and for this purpose use would be made not only of the average rotary behavior m2, but also of the most recently determined average rotary behavior m3 in order to use an average rotary behavior mq and to determine the prognosis therefrom (mq=/2*(m2+m3).

What is accordingly disclosed is a method according to which the arithmetic mean value of the average rotary behavior mq is a moving mean value, wherein an older past average rotary behavior m1 is exchanged for a more recent past average rotary behavior m3 for determining a current arithmetic mean value of the average rotary behavior mq.

The method sequence described to date is the core of the method presented here. In this case, the average gradient of the current run-down is determined at a few periodically recurring crankshaft or driveshaft positions.

In this case, these selected support points or points PK (P11, P12, P13, P21, P22, P23, ...) lie at least close to the average run-down gradient, i.e. the oscillating part above and below the average run-down gradient is approximately of the same magnitude and does not need to be taken into consideration when determining the gradient. To predict the further run-down, the thus determined gradient m—be it an average past rotary behavior mq (moving or non-moving) or, for example, a last past rotary behavior—is updated into the future. "Close to the average run-down gradient" can mean, for example, that the support points PK lie exactly or approximately between a BDC and a TDC or the respective driveshaft angles PHI.

To further clarify the method described to date, it is provided to superpose the oscillating part on this sectionally linear course by means of a suitable energy transformation characteristic curve (ETF characteristic curve) and accordingly to no longer determine only average rotational speeds, but rather to perform a calculation in which, taking the oscillating parts into consideration (addition or subtraction), curves can be determined for rotational speeds nX at points in time tX (curve synthesis) which come very close to realistic curves K. Furthermore, in this case the method will take into consideration the physical effect whereby the maximum amplitudes of the oscillating part are dependent on the rotational speed.

A standardized energy transformation characteristic curve specific to the type of engine can be formulated for an engine or an internal combustion engine which is in run-down mode. Thus, this is made available, for example, to a central processing unit in a suitable manner, for example as a look-up table. Look-up tables are data structures which contain pre-calculated data from a complicated calculation. With the aid of such a table, it is possible to reduce and to simplify complex calculations to the generally considerably faster value searches within a data field. In the case where a different value close to a specific value is required, this means that the exactly assigned value can be gathered from such a table, or in the case where the exact value is not available in this table, a new, for example, mean value can be determined without hesitation from two existing values in the table. This table indicates conformally (with respect to the crankshaft or driveshaft 13 and the rotary position PHI thereof) which proportion of the maximum potential energy is currently converted as kinetic energy on the crankshaft or driveshaft, i.e. the ETF characteristic curve characterizes the cyclically occurring energy conversion of potential energy (for example with a piston positioned close to a top dead center) to kinetic energy (motion energy of a piston between a top dead center and a bottom dead center), and vice versa. The minima of the ETF characteristic curve typically lie at the ignition TDC positions of the engine (TDC is the abbreviation for top dead center). Here, the energy stored in the compression is at its greatest and is therefore not available as a contribution to the kinetic energy of the engine. With reference to FIG. 2, the minimum Min2 is accordingly a sign that a specific ignition TDC position has been established here more or less in the internal combustion engine. Analogously thereto, the maximum Max2 is a sign that a bottom dead center has been established more or less on the internal combustion engine 10 or on the driveshaft 13.

Figure 4:
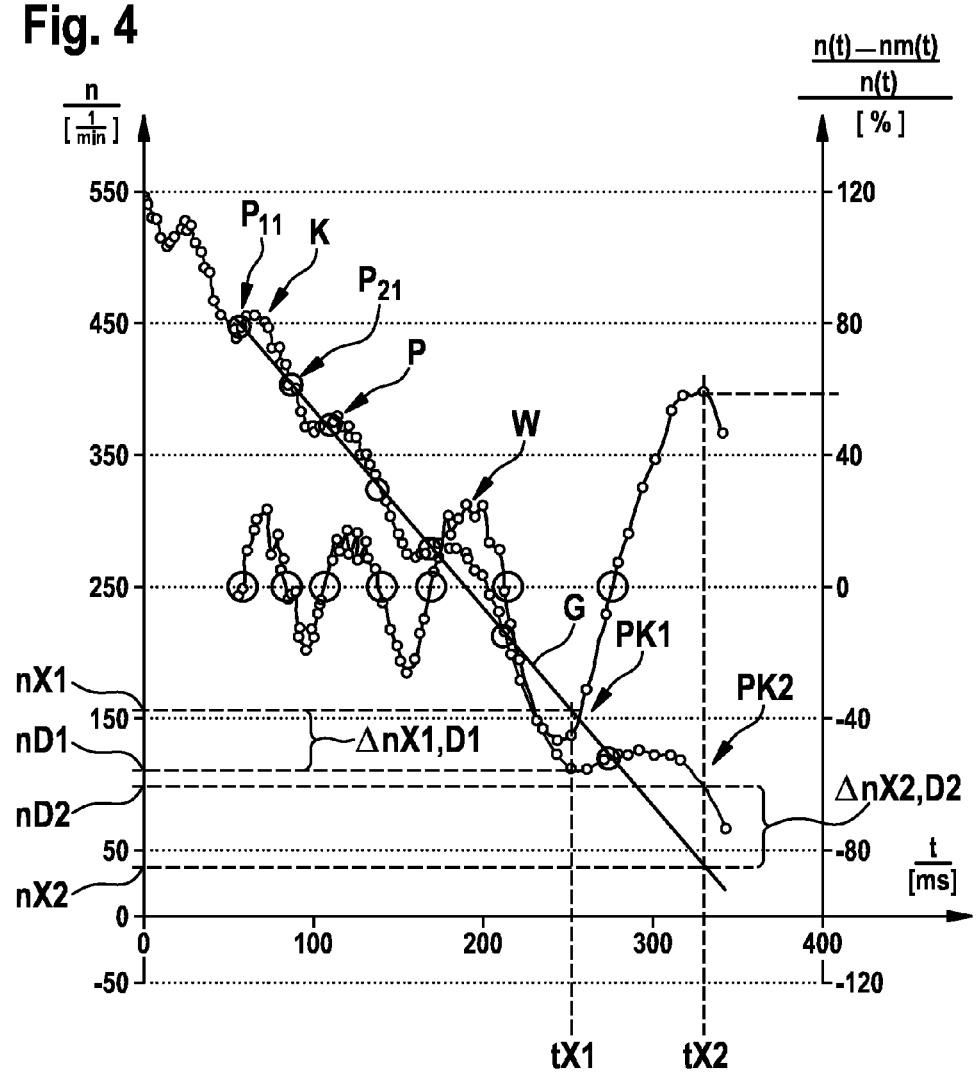
FIG. 4 shows firstly the rotational speed/time graph from FIG. 2 with the curve K and also, superposed, the respective alteration components of the curve K, which are superposed on an average rotational speed course.

FIG. 4 shows the curve K from FIG. 2. In addition to this curve K, FIG. 4 shows a further curve W. This curve W explains the alteration component on the actual rotational speed nX at the general point in time tX. Accordingly, whenever the alteration component is 0, a common intersection is formed by the curve K and a sectionally straight line (line G) with the average rotational speed property m.

Two points PK1 and PK2 are highlighted in FIG. 4. The time tX1 and the actual rotational speed nD1 with the deviation to the average rotational speed property, here the average rotational speed nX1, are applicable for the point PK1. The difference between nX1 and nD1 is $\Delta n_{X1,D1}$. Analogously thereto, at the point in time tX2, the average rotational speed is nX2, the actual rotational speed is nD2 and the difference between the two rotational speeds mentioned is $\Delta n_{X2,D2}$ at the point PK2. As a numerical example, what arises accordingly for the point PK2 are a rotational speed nX2=40/min and nD2=100/min for the actual rotational speed. The difference between the actual rotational speed nD2 and the average rotational speed nX2 is $\Delta n_{X2,D2}$=60/min. This means that the alteration component $\Delta n_{X2,D2}$ on the actual rotational speed nD2 is 60%, see also FIG. 4. In the example for the point PK1, a component of −48% arises as the percentage alteration component $\Delta n_{X1,D1}$. On the basis of FIG. 4, it is clear that the percentage alteration component tends to be higher, the lower the rotational speed n or nX.

Figure 5:
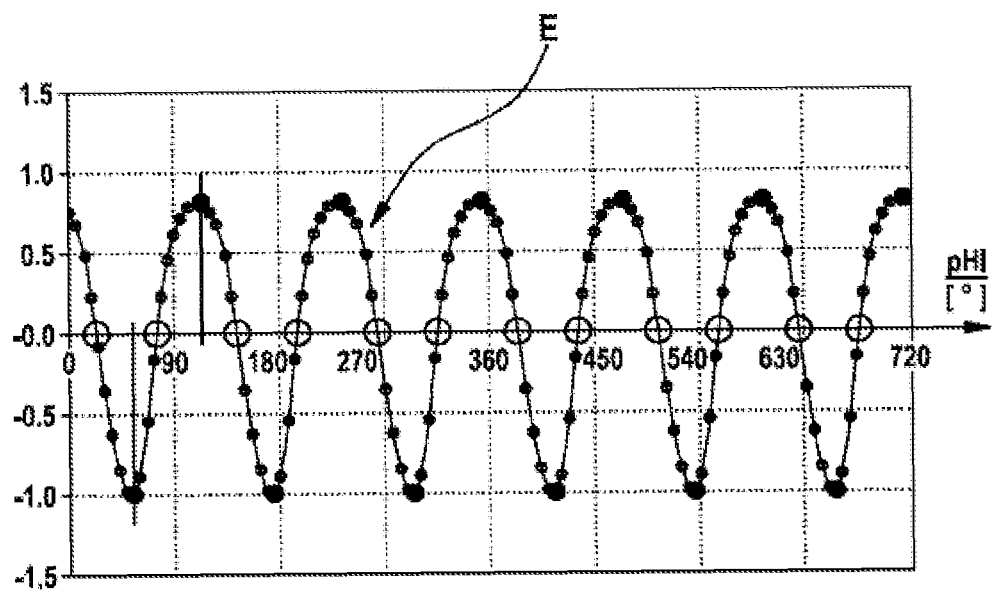
FIG. 5 shows a standardized energy transformation characteristic curve which is specific to the type of engine.

FIG. 5 shows a standardized energy transformation characteristic curve specific to the type of engine. On the basis of the six minima or maxima over an angle variation of in total 720°, which overall corresponds to two complete revolutions of a driveshaft 13, it can be seen that said figure, FIG. 5, is a standardized energy transformation characteristic curve of a 6-cylinder engine. Since the six minima or maxima are not arranged regularly, what is involved is not a series 6 cylinder, but rather in this case a V6 cylinder engine. This standardized energy transformation characteristic curve, here denoted by the capital letter E, is shown in this case as a polyline. That is to say, various values are assigned to specific angles PHI. This standardized energy transformation characteristic curve is made available to the central processing unit (CPU) in a suitable manner, for example by the look-up table already mentioned or another suitable look-up table. This table indicates conformally, i.e. for various crankshaft angles or driveshaft angles PHI, which proportion of the maximum potential energy is currently converted as kinetic energy on the crankshaft or driveshaft 13. The energy transformation characteristic curve E characterizes the cyclically occurring energy conversion of potential energy to kinetic energy, and vice versa. The minima of the energy transformation characteristic curve typically lie at the ignition TDC positions of the engine. Here—as already mentioned—energy stored in the compression is at its greatest and is therefore not available as a contribution to the kinetic energy of the engine.

With the standardized energy transformation characteristic curve as part of the further specified prognosis algorithm, a so-called amplitude characteristic curve is used. A "standard" amplitude characteristic curve specific to the type of engine can be formulated for an engine or an internal combustion engine which is in run-down mode. This amplitude characteristic curve, too, is made available to the central processing unit in a suitable manner, i.e. in this case too, if appropriate, as a look-up table. The standardized energy transformation characteristic curve is therefore stored in a characteristic map in the form of standardized values, with a rotary position PHI of the driveshaft 13 being assigned to a standardized value. A rotational-speed-dependent amplitude characteristic value A(n) is therefore stored in another characteristic map.

The standard amplitude characteristic curve indicates which maximum amplitudes are established under standard conditions at the corresponding maximum points depending on the rotational speed at these two points, cf. also for example FIG. 4, the points PK1 and PK2. This does not mean that the two points PK1 and PK2 represent standard conditions in the run-down of the engine shown therein. This merely means that the standard amplitude characteristic curve provides maximum amplitudes under standard conditions for the rotational speed nD1 and nD2.

The following relationships can serve in this case as the theoretical basis for determining the amplitude depending on the rotational speed. Thus, using the rotational speed difference between bottom dead center and ignition TDC (top dead center), the following relationship can be derived for the amplitude in the local maxima or minima $A(n_A)$:

$$A(nA)=\tfrac{1}{2}*(((2*\Delta E)/J)+(nA)^{2})^{(1/2)}-n(A) \quad (1)$$

Here, $\Delta E$ is the energy difference between the bottom dead center and the ignition TDC, J is the moment of inertia of the internal combustion engine, which takes into consideration, by way of example, the rotary moments of inertia of the driveshaft 13 and possibly the moments of inertia of the connecting rods and also pistons, and n(A) is the rotational speed in the local maximum or minimum (ignition TDC/BDC).

Various instances of engine run-down differ in their amplitude of the oscillating part depending on the ambient and operating conditions which are currently present. This variation is summarized in the parameter K. It is a measure for how much energy is converted into compression energy.

$$K=2*\Delta E/J \quad (2)$$

Figure 6:
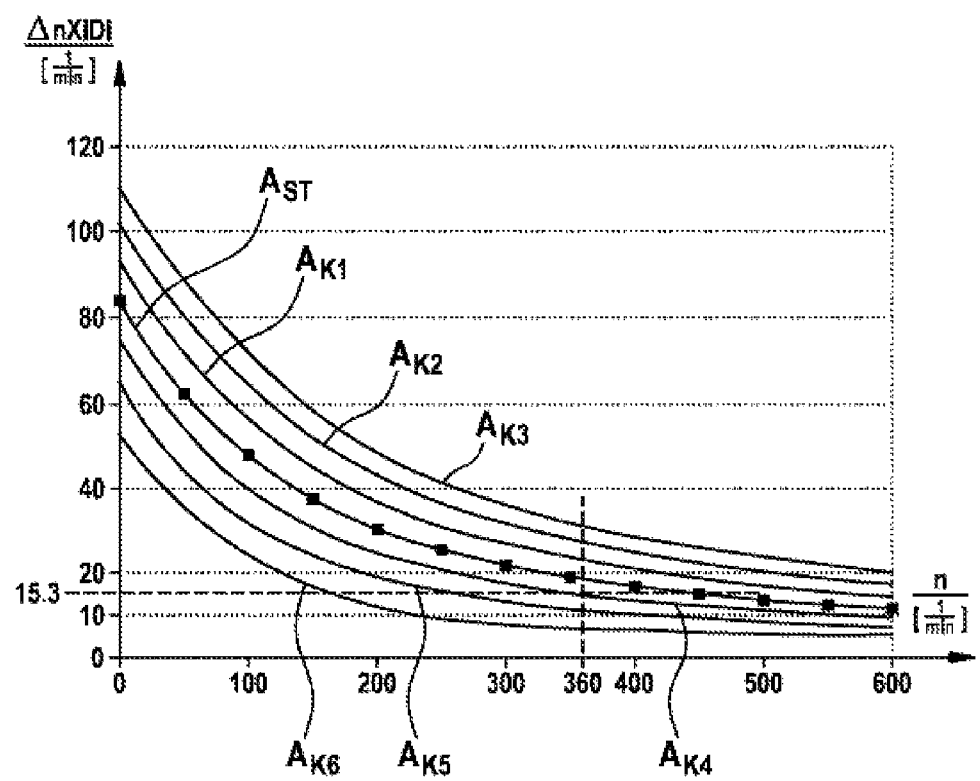
FIG. 6 shows a plurality of amplitude characteristic curves which are specific to the type of engine.

To avoid the extraction of roots in the central processing unit, characteristic curves with, for example, a progressively smaller or larger K are preferably available as look-up tables below and above the standard amplitude characteristic curve. The range which is covered for K in this respect depends on the possible variation of the environment and ambient conditions of the engine type. In FIG. 6, the standard amplitude characteristic curve AST has a factor K of 28 000. The other amplitude characteristic curves AK1, AK2, AK3, AK4, AK5 and AK6 denote curves with a different K factor. Each of these stages is assigned a suitable amplitude correction factor which is then used for prognosticating the further run-down. To determine intermediate values, it is possible to use all known interpolation methods (e.g. linear interpolation or interpolation by means of higher-degree polynomials).

A calculation specification can preferably also be assigned to each of the stages. This calculation specification is then applied for the prognosis on the standard amplitude characteristic curve. Therefore, depending on the selected stage, a corrected amplitude is available. In this case, too, the common interpolation methods can additionally be used between the stages.

A standard amplitude characteristic curve AST specific to the type of engine can be formulated for an engine which is in run-down mode, and in this case is shown, by way of example, in FIG. 6. The standard amplitude characteristic curve AST indicates which maximum amplitudes arise under standard conditions at the corresponding rotational speeds. In order to determine the correction stage, the actually measured maximum amplitudes are compared with the amplitudes of the various correction stages (K stages) in a manner dependent on the rotational speed. The stage in which the comparison yields the smallest deviation is used to determine the correction factor or to stipulate the correction calculation specifications. During the comparison, the amounts and the sum/difference formations are preferably set such that deviations of the position of the support point from the actual average run-down straight line with the property m have only a small effect or have no effect at all.

Figure 3:
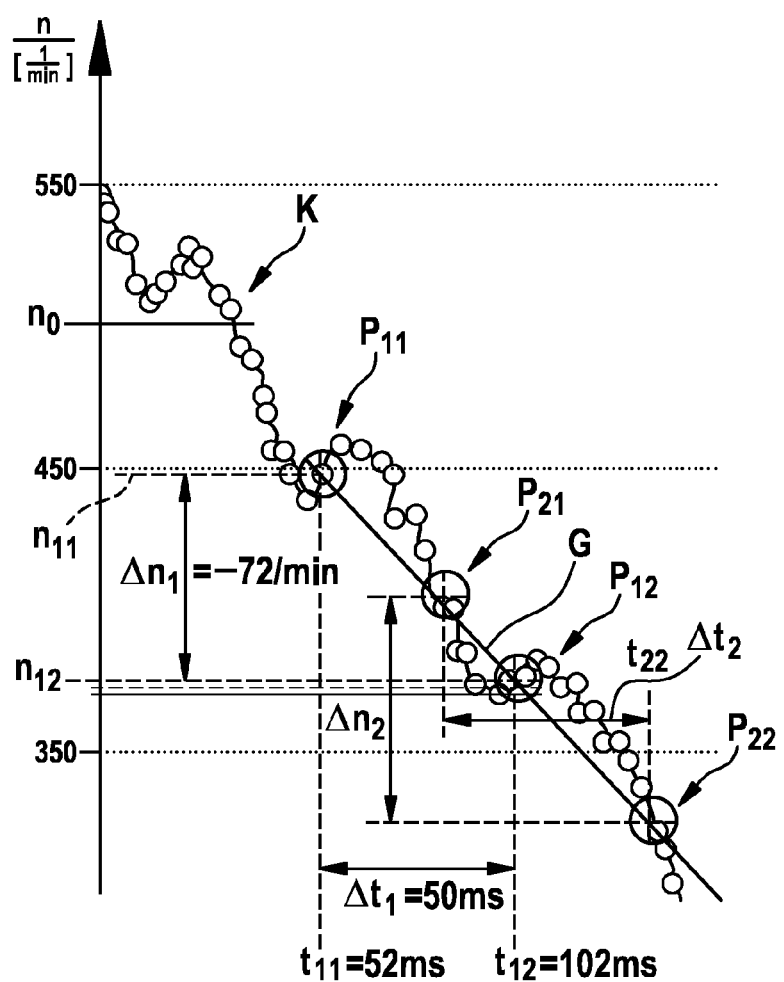
FIG. 3 shows an excerpt from the rotational speed graph shown in FIG. 2.
Figure 7:
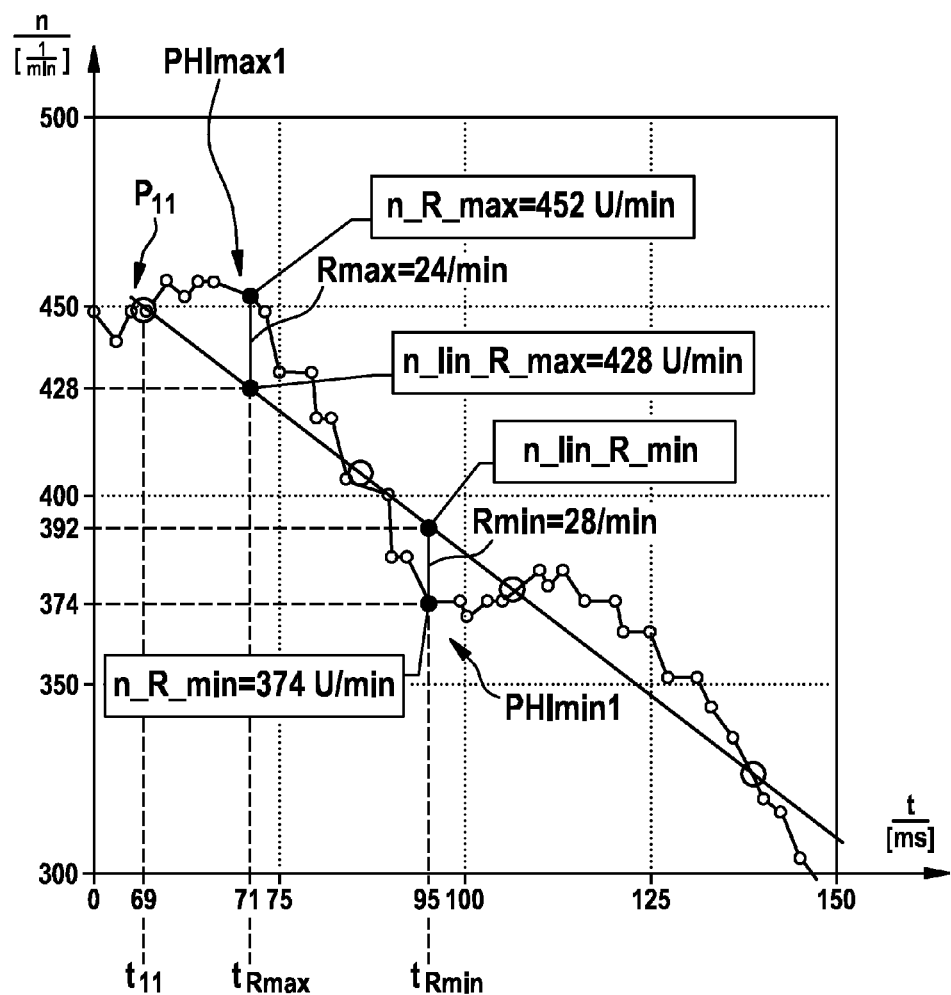
FIG. 7 shows a method for determining amplitudes.

For each engine, in each case one or more angular values are stipulated from the energy transformation characteristic curve specific to the type of engine, see also FIG. 5, as reference points at the maximum and at the minimum, and are made available in a suitable manner to the CPU as parameters specific to the type of engine. By way of example, the method is shown here using only one angular reference value at the maximum and only one reference angular value at the minimum, FIG. 7. The points shown in FIG. 7 correspond substantially to the points as are also shown in FIG. 3.

Below a preselectable rotational speed threshold, which is already denoted in FIG. 3 by n0, for example, the rotational speed values and points in time are each recorded when the maximum amplitude Rmax and the minimum amplitude Rmin are reached, and are made available as input data for further calculations. If the indicator wheel mentioned in the introduction reaches a specific angular position (reference angular value), which here is denoted by Phi max1, for example, after which the rotational speed threshold n0 is undershot, the rotational speed nRmax is determined, which here is 452/min. Proceeding from the calculation method which has already been described for determining the average rotary behavior m, the linear proportion of the rotational speed n_lin_Rmax is determined for this reference angular value Phi max1. That is to say, proceeding from the point P11, see the preceding explanation relating, for example, to FIG. 2 and FIG. 3 in conjunction with the average rotary property m, the point in time t11, the point in time tRmax, the linear proportion of the rotational speed can be determined. This linear proportion n_lin_Rmax in this case is 428/min. The determined values for n_Rmax and n_lin_Rmax therefore give rise to an amplitude Rmax at tRmax of nRmax−n_lin_Rmax=24/min.

A current and actual rotational speed value of n_Rmin=374/min arises for the angle Phi min 1 at the point in time tRmin=95 ms (ms=milliseconds). The linear proportion of the rotational speed n_lin_Rmin at the point in time tRmin=95 ms arises, proceeding from the properties of the point P11, the average rotational speed property M1 and the time delta between tRmin and t11 of 31 ms, as 392/min. The minimum amplitude accordingly arises at this position Phi min 1 as Rmin=18/min.

Figure 8:
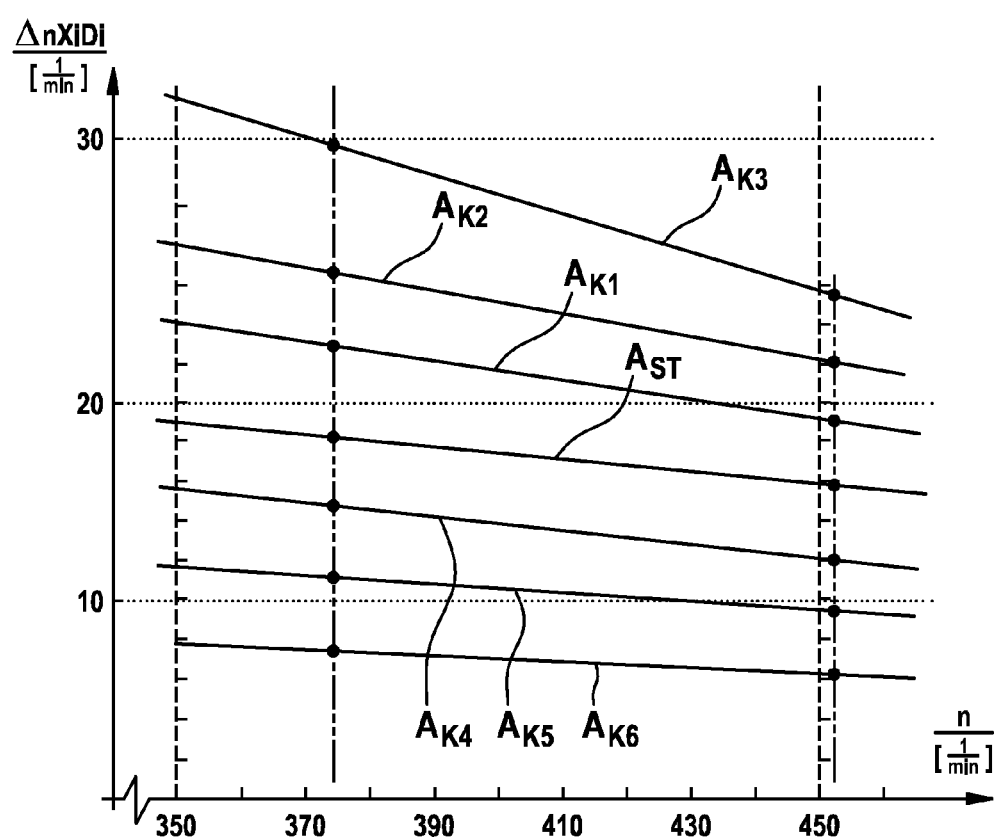
FIG. 8 shows an enlargement of an excerpt from FIG. 6.

As already explained in relation to FIG. 6, a standard amplitude characteristic curve AST and correction stages A1 to AK6 are defined, by way of example, for determining the rotational speed n(t) to be prognosticated, taking into consideration the amplitude behavior above and below the falling linear proportion of the rotational speed characteristic curve. Since even these correction stages AK1 to AK6 can represent only approximations to an actual state, it is provided to achieve an even better approximation by means of an amplitude correction factor. In order to determine the correction stage which is to be used in the individual case, the actually measured maximum amplitudes Rmax and Rmin are compared with the amplitudes of the various correction stages in a manner dependent on the rotational speed. The stage in which the comparison yields the smallest deviation is used to determine the correction factor or to stipulate the correction calculation specification. During the comparison, the amounts and the sum/difference formations are preferably set such that deviations of the position of the support point from the actual average run-down straight line have only a small effect or have no effect at all: as a formula, the amplitude deviation Adev arises, upon comparison with the standard amplitude characteristic curve, as $$Adev\_std=|(A\max\_std(n)-R\max)+(R\min-A\min\_std(n))|, \quad (3)$$

where Rmax=24/min, Rmin=18/min, Amax_std(n)=15.3/min, Amin_std(n)=18/min, such that Adev_std=8.7/min. The values can be gathered from FIG. 8, which shows an enlargement of an excerpt from FIG. 6. In actual fact, the corresponding values lying between fixed values in the table are determined by averaging. The correction stages AST, AK1, Ak2, AK3, AK4, AK5 and AK6 are stored, for example, as values depending on the rotational speed of the driveshaft n. These plurality of different characteristic curves AST, AK1, Ak2, AK3, AK4, AK5 and AK6 are stored in one or more characteristic maps, wherein different amplitude characteristic values can be determined using the plurality of different characteristic curves AST, AK1, Ak2, AK3, AK4, AK5 and AK6.

As a formula, the amplitude deviation Adev arises, upon comparison with the amplitude characteristic curve of the first correction stage (curve AK1), as $$Adev\_s1=|(A\max\_s1(n)-R\max)+(R\min-A\min\_s1(n))|, \quad (4)$$

where Rmax=24/min, Rmin=18/min, Amax_s1(n)=19/min, $A\min\_s1(n)$=24.0/min, such that $$Adev\_s1=11.0/\min.$$

As a formula, the amplitude deviation Adev arises, upon comparison with the amplitude characteristic curve of the second correction stage, as $$Adev\_s2=|(A\max\_s2(n)-R\max)+(R\min-A\min\_s2(n))|, \quad (5)$$

where Rmax=24/min, Rmin=18/min, $A\max\_s2(n)$=22.0/min, $A\min\_s2(n)$=26.3/min, such that $$Adev\_s2=10.3/\min.$$

As a formula, the amplitude deviation Adev arises, upon comparison with the amplitude characteristic curve of the third correction stage, as $$Adev\_s3=|(A\max\_s3(n)-AR\max)+(AR\min-A\min\_s3(n))|, \quad (6)$$

where Rmax=24/min, Rmin=18/min, Amax_s3(n)=33.0/min, Amin_s3(n)=18/min, such that $$Adev\_s3=9.0/\min.$$

As a formula, the amplitude deviation Adev arises, upon comparison with the amplitude characteristic curve of the fourth correction stage, as $$Adev\_s4=|(A\max\_s4(n)-R\max)+(R\min-A\min\_s4(n))|, \quad (7)$$

where Rmax=24/min, Rmin=18/min, Amax_s4(n)=14.6/min, Amin_s4(n)=11.5/min, such that $$Adev\_s4=2.9/\min.$$

As a formula, the amplitude deviation Adev arises, upon comparison with the amplitude characteristic curve of the fifth correction stage, as $$Adev\_s5=|(A\max\_s5(n)-R\max)+(R\min-A\min\_s5(n))|, \quad (8)$$

where Rmax=24/min, Rmin=18/min, Amax_s5(n)=11/min, Amin_s5(n)=9.2/min, such that $$Adev\_s5=4.2/\min.$$

As a formula, the amplitude deviation Adev arises, upon comparison with the amplitude characteristic curve of the sixth correction stage, as $$Adev\_s6=|(A\max\_s6(n)-R\max)+(R\min-A\min\_s6(n))|, \quad (9)$$

where Rmax=24/min, Rmin=18/min, Amax_s6(n)=7.3/min, Amin_s6(n)=6/min, such that $$Adev\_s6=4.7/\min.$$

As is therefore evident from the above calculations, the fourth correction stage is the correction stage best suited for forecasting.

After the first run-down gradient or average rotary behavior m1 has been determined, and upon each further calculated average run-down gradient or each further average rotary behavior mi, a prognosis is calculated. As the so-called rotational speed support point for the calculation of the prognosis, use is made of a rotational speed n11 or n21 at a point P11 or P21, depending on which point has just been passed through. The prognosis steps can in this case be based on various units. By way of example, this can be effected with reference to fixed angular steps which can be guided, for example, by the signaler wheel or indicator wheel. As the angular step, these are 6° for example. Furthermore, these prognosis steps can also be guided by fixed time steps, which are for example five milliseconds.

The text which follows will present the method by way of example with fixed time steps. For the Xth prognosis, the linear proportion of the run-down n_lin is calculated for the next time steps i*h. i corresponds to a genuine number, and h corresponds to a time step. The intention here is for currently a point Px (assumption: P22, FIG. 9) to be passed through, and to determine the average run-down gradient mx (e.g. as a result of the gradient between the two points P11 and P12 or a plurality of gradients and the, possibly moving, mean value thereof). It is assumed here by way of example that the gradient is an averaged result of the gradients between the points P11 and P12 or the points P21 and P22. This then gives rise to the equation $$n\_\text{lin}_i = n\_Px + mx*i*h, \quad (10)$$

which indicates the linear proportion of the rotational speed at the point in time i*h after the point in time which is assigned to the point Px. The point in time at which n_lin, is established is then ti, where ti is calculated as $$ti = ti\_Px + i*h. \quad (11)$$

ti_Px is the point in time at which the state has arisen at the point Px or P22.

Figure 9:
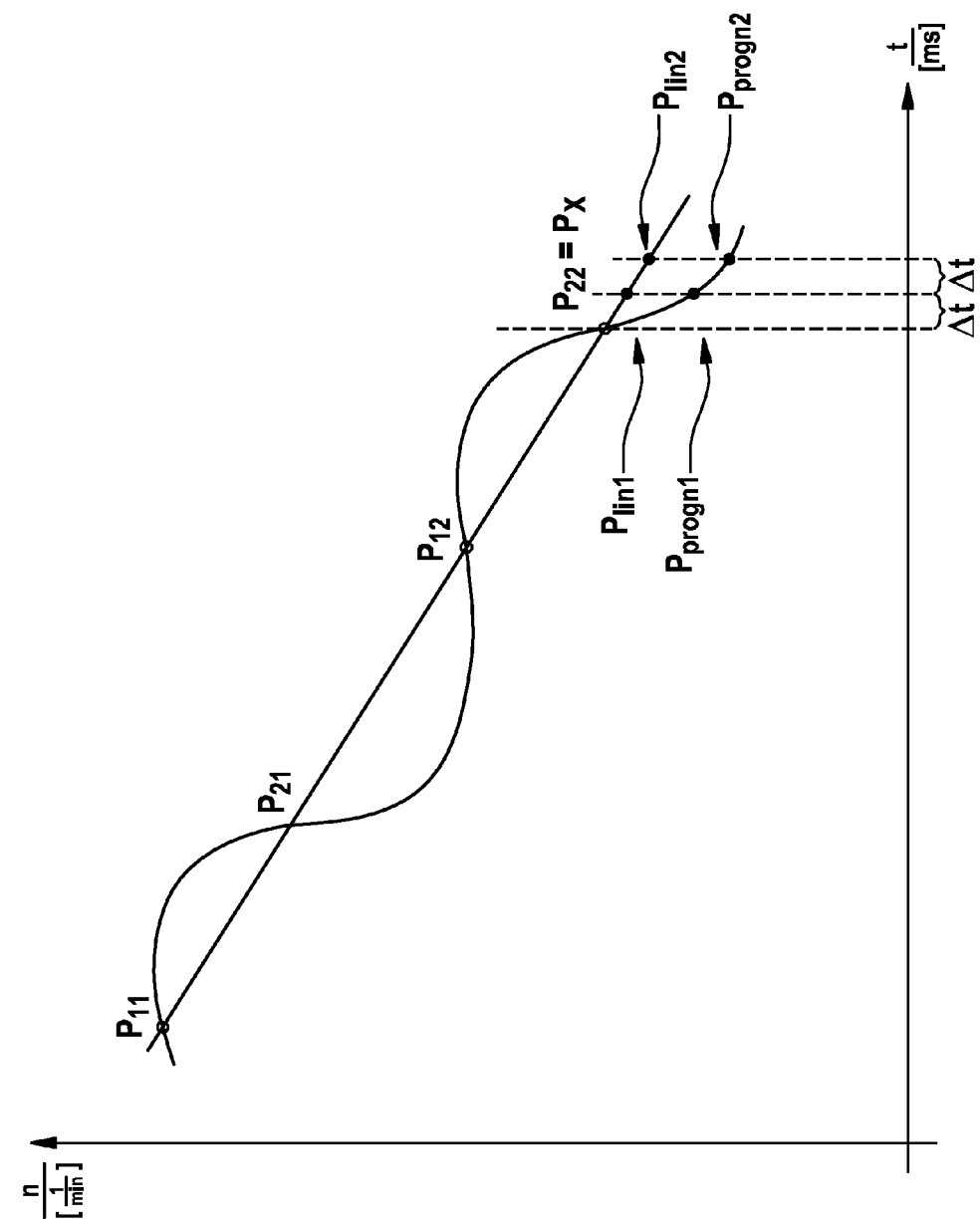
FIG. 9 shows an example of a calculation method.

In the example according to FIG. 9, the point Plin1 is the point at which the linear proportion n_lin_i, where i=1, arises as n_lin_1. Analogously thereto, this applies to the point Plin2, at which the linear proportion n_lin_i, where i=2, arises as n_lin_2. The time step h corresponds to the time difference or time step denoted by Δt in FIG. 9.

The prognosticated rotational speed n prog i at the point in time i*h is obtained by applying the energy transformation characteristic curve and the amplitude characteristic curve to the forecast linear rotational speed. For the sake of simplicity, the correction function is calculated here by way of example from the preceding amplitude analysis with the amplitude characteristic curve with an appropriate K value.

$$n\_progn\_i = n\_lin\_i + A(n) * Factor\_ETF. \quad (12)$$

The value for A(n) is obtained by calculating the equation (1) with the suitable K value from the determined correction stage taking the rotational speed for which the value is to be prognosticated into consideration. The factor_ETF is obtained from FIG. 5 or a table from which FIG. 5 or the curve therein can be gathered. The calculated rotational speed n_progn_i=n_progn_1 is therefore present at the point Pprogn1, and the calculated rotational speed n_progn_i=n_progn_2 is therefore present at the point Pprogn2. The method can thus be continued—i.e. without further alignment with states which have actually been passed through and without resulting adaptation of the correction stage—until the rotational speed n_progn_i=0.

The alteration component is therefore determined as the product of a standardized value Factor_ETF and a rotational-speed-dependent amplitude characteristic value A(n).

A characteristic curve AST, AK1, Ak2, AK3, AK4, AK5, AK6 is therefore selected from a plurality of characteristic curves AST, AK1, Ak2, AK3, AK4, AK5, AK6 in that a difference between an extremum (minimum, maximum) and a mean value n_lin_i is calculated from a specific measured state n Px by means of the past average rotary behavior m1; m2; mq, mx and, by comparison with the different characteristic curves AST, AK1, Ak2, AK3, AK4, AK5, AK6, a suitable characteristic curve AST, AK1, Ak2, AK3, AK4, AK5 or AK6 for calculating a state of the driveshaft at a later point in time ti is selected.

The method can also be continued, however, by repeatedly updating values. These values include the property of the driveshaft 13 at a specific recurring angle. After the point P22, this would correspond, for example, to the point P23 and the gradient m actually present between these two points, or the gradient between the points P12 and P13, which is used for updating. Furthermore, the new correction stage would then also be determined, and the further course of the curve would be determined from the actual point P13 or P23 and the properties thereof (t13, t23, m), as just described.

Figure 10A:
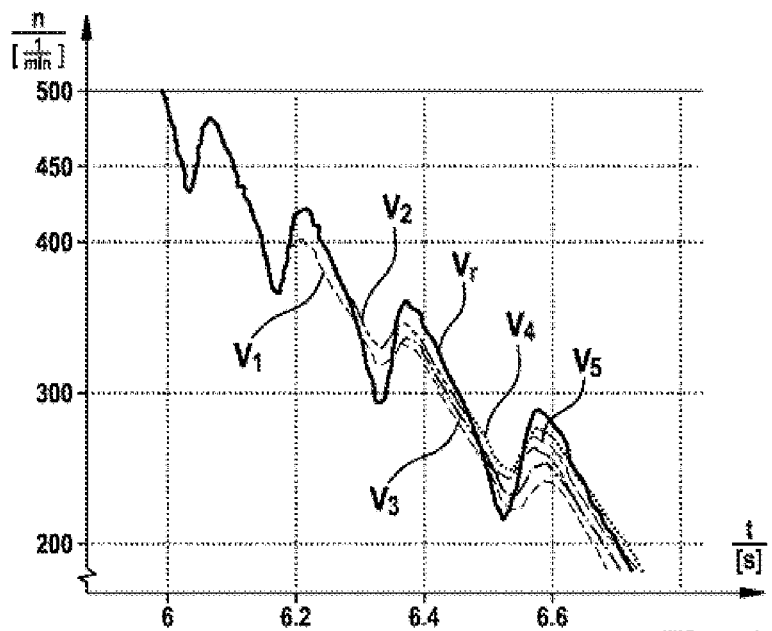
Figure 10B:
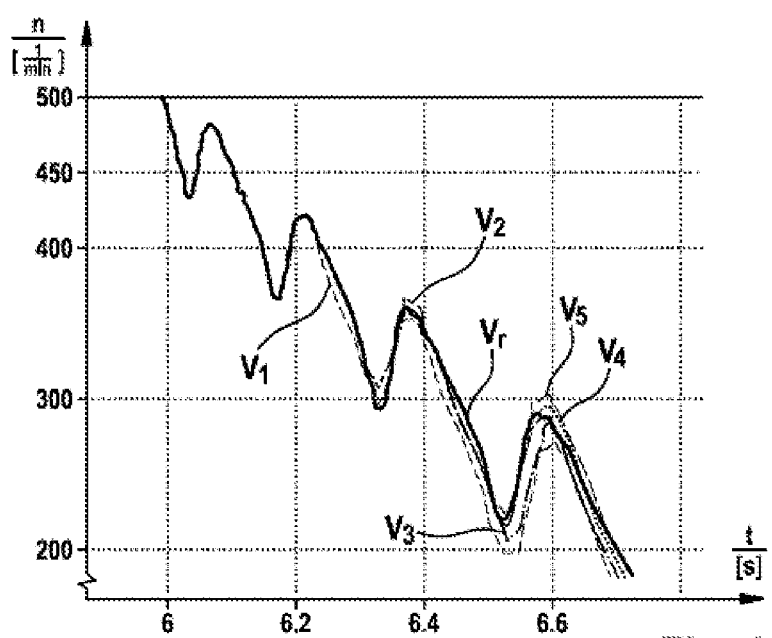

FIGS. 10a and 10b show the prognosis of the rotational speed course of the driveshaft 13 using different amplitude correction methods. Thus, FIG. 10a shows, in addition to an actual rotational speed course Vr, in total five different courses V1, V2, V3, V4 and V5, which were determined using different prediction methods beginning at different points in time, which as a whole were all determined with the so-called compression parameter K=22 000 and without amplitude correction.

FIG. 10b once again shows an actual rotational speed course (measured) and five other predictions or courses V1, V2, V3, V4 and V5 of a rotational speed course with different correction stages and the compression parameter K=60 000. It becomes clear, by comparing these two figures, FIGS. 10a and 10b, that the prognosis of the rotational speed course can proceed with differing degrees of accuracy depending on the amplitude correction. In the examples according to FIGS. 10a and 10b, the deviations are different. Thus, in the case of the last relative maximum shown in FIG. 10a, the values vary between 240/min and 290/min. In FIG. 10b, the values vary between 270/min and 300/min.

In the example according to FIG. 11, the values at t=6.4 vary only by 15/min. According to the illustration in FIG. 11, the gradient and also the amplitude range in the respectively preceding ignition period, i.e. between two relative minima, were analyzed within a measured course Vr. In this case, the intention was to determine the point in time at which a rotational speed of 80/min would have been reached. As can be seen, the deviation is a few hundredths of a second. At this point in time tStart, a starter was then switched on, the pinion of which preengages and engages into the toothed ring of the internal combustion engine, in order to then restart the internal combustion engine at t=6.52 and consequently to increase the rotational speed of the internal combustion engine or of the driveshaft 13, see also the first compression stroke Kh in FIG. 11.

Using a fixed scheme, a learning algorithm preferably analyzes the correction measures used in the past period of time and derives, for example, a new K value as the standard value therefrom, or calculates a new, adapted standard amplitude characteristic curve for further use. Within the context of this learning algorithm, in view of a fixed scheme it is possible, for example, to provide a fixed period of time, a defined kilometer reading, the number of start-stop cycles, the dependency on ambient and operating conditions and any desired combinations of the aforementioned criteria. In addition, it is possible to take deviations which are present from cylinder to cylinder in any internal combustion engine into consideration. In the case of engines having a plurality of cylinders, a correction factor is assigned to each cylinder pairing for the amplitude at Rmax and for the amplitude at Rmin. What is thereby obtained when analyzing the run-down is an average maximum amplitude which is applicable for this run-down. Such a correction may be expedient, for example, when in this case adjacent cylinders or cylinder pairs have different compression pressures, and therefore the maximum amplitudes can turn out to be different. A cylinder pairing may, for example, consist of a cylinder which runs from the so-called ignition TDC to BDC and the next cylinder which runs according to the ignition sequence from BDC to ignition TDC.

Figure 12:
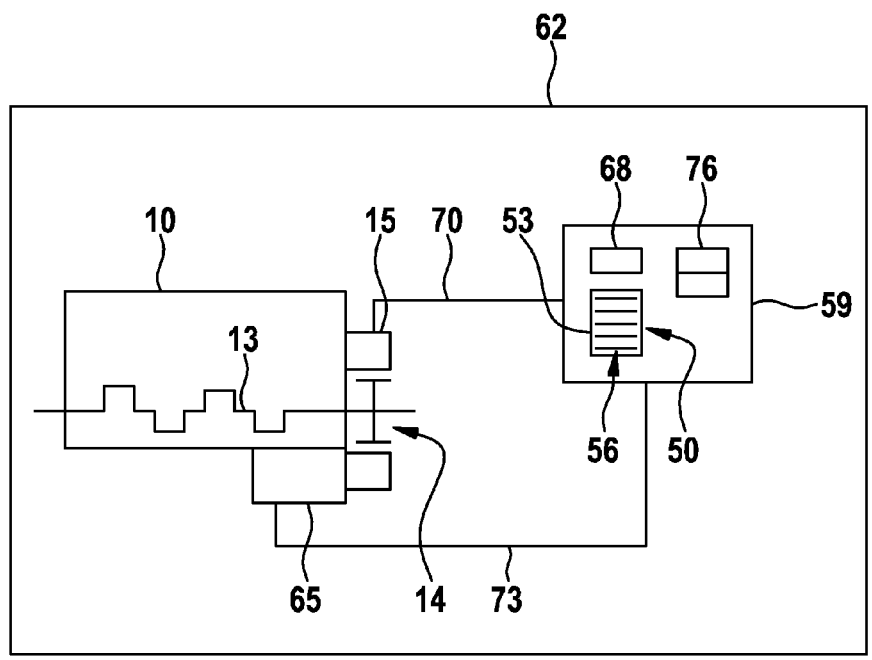

According to FIG. 12, provision is made of a computer program product 50 which can be loaded into at least one program memory 53 with program commands 56 in order to execute all of the steps of the method according to at least one of the preceding variants if the program is executed in at least one control unit 59.

Provision is made of a control unit 59 for start-stop operation of an internal combustion engine 10 in a motor vehicle 62 for rapidly stopping and starting the internal combustion engine 10, wherein the internal combustion engine 10 can be started by means of an electric starting apparatus or starter 65, wherein the control unit 59 has a processor 68 with a program memory 53. The processor 68 is formed as a measurement, evaluation and control device in order to activate the starting apparatus 65 in a defined manner, wherein a computer program product 50 is loaded into the program memory 53 in order to execute the method. The sensor 15 is connected to the control unit 59 by means of a data transmission device 70 in order to transmit signals. The control unit 59 is connected to the starter 65 by means of a control signal transmission device 73 in order to switch on the starter 65 at the correct point in time tStart, to preengage the pinion thereof into the toothed ring and to restart the internal combustion engine 10. The memories 76 which may be required for receiving the characteristic maps are preferably installed in the control unit 59.

The invention claimed is:

1. A method for determining a rotational speed of a driveshaft of an internal combustion engine, wherein the rotating driveshaft assumes various rotary positions at different points in time, the method comprising:
- determining an average gradient of rotary speed for the driveshaft from at least two rotary positions; and
- subsequently obtaining an average rotational speed for the driveshaft from the past average gradient of rotary speed at at least one later point in time.

2. The method as claimed in claim 1, wherein the method begins with the determination of rotary positions and the different points in time thereof below a set rotational speed threshold.

3. The method as claimed in claim 1, wherein the driveshaft comprises a crankshaft.

4. A computer program product for loading into at least one program memory with program commands in order to execute all of the steps of the method as claimed in claim 1.

5. A control unit for start-stop operation of an internal combustion engine in a motor vehicle for rapidly stopping and starting the internal combustion engine, wherein the internal combustion engine is capable of being started by an electric starting apparatus, wherein the control unit has a processor with a program memory, wherein the processor is formed as a measurement, evaluation and control device in order to activate the starting apparatus in a defined manner, wherein a computer program product as claimed in claim 4 is loaded into the program memory in order to execute the method.

6. The method as claimed in claim 1, further comprising determining a further past average gradient of rotary speed for the driveshaft after the past average gradient of rotary speed for the driveshaft has been determined.

7. The method as claimed in claim 6, further comprising obtaining an average rotational speed for the driveshaft based on the further past average gradient of rotary speed at at least one later point in time.

8. The method as claimed in claim 7, wherein the past average gradient of rotary speed or a plurality of further past average gradients of rotary speed is or are used to determine an arithmetic mean value of the average gradient of rotary speed.

9. The method as claimed in claim 8, wherein the arithmetic mean value of the average gradient of rotary speed for the driveshaft is a moving mean value, wherein an older past average gradient of rotary speed behavior is exchanged for a more recent past-average gradient of rotary speed for determining a current arithmetic mean value of the average rotary behavior as the steps of determining an average gradient of rotary speed for the driveshaft and subsequently obtaining an average rotational speed for the driveshaft are repeated.

10. A method for determining a rotational speed of a driveshaft of an internal combustion engine, wherein the rotating driveshaft assumes various rotary positions at different points in time, the method comprising:
- determining an average rotary speed for the driveshaft from rotary speed at at least two rotary positions; and
- obtaining an average rotational speed for the driveshaft from the average rotary speed at at least one later point in time,
- wherein an alteration component is added to the average rotational speed at a point in time for determining a prognosticated rotational speed.

11. The method as claimed in claim 10, wherein a point in time at which a starter is switched on at the latest so that it engages with its pinion into a toothed ring of the internal combustion engine is calculated.

12. The method as claimed in claim 10, wherein the driveshaft comprises a crankshaft.

13. The method as claimed in claim 10, wherein the alteration component is determined as the product of a standardized energy transformation value and a rotational-speed-dependent amplitude characteristic value.

14. The method as claimed in claim 13, wherein the standardized energy transformation value is stored in an energy transformation characteristic map, wherein a rotary position is assigned to the standardized energy transformation value and a rotational-speed-dependent amplitude characteristic value is stored in another characteristic map.

15. The method as claimed in claim 10, wherein the alteration component is determined as the product of a standard amplitude value from a standard amplitude characteristic curve and a rotational-speed-dependent amplitude characteristic value.

16. The method as claimed in claim 8, wherein, depending on the rotational speed (n) of the driveshaft, a plurality of different characteristic curves are stored in one or more characteristic maps, wherein different amplitude characteristic values are determined using the plurality of different characteristic curves.

17. The method as claimed in claim 16, wherein a characteristic curve is selected from the plurality of characteristic curves in that a difference between an extremum and a mean value is calculated from a specific measured state by the average rotary speed and, by comparison with the different characteristic curves, a suitable characteristic curve for calculating a state of the driveshaft at a later point in time is selected.

* * * * *